Patented Apr. 8, 1930

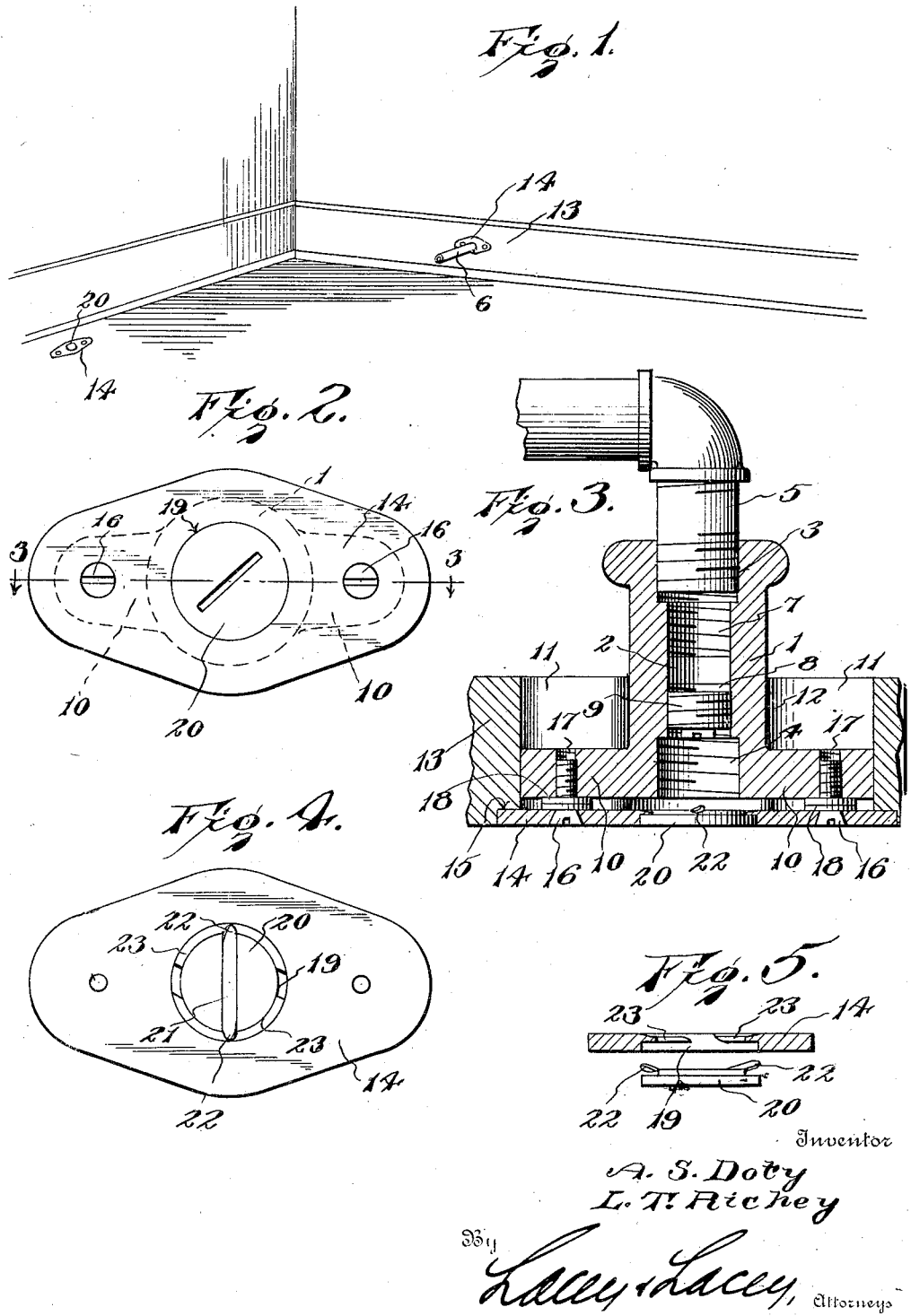

1,753,853

UNITED STATES PATENT OFFICE

ALFRED S. DOTY, OF ASHLAND, KENTUCKY, AND LEON T. RICHEY, OF HUNTINGTON, WEST VIRGINIA

OUTLET TERMINAL FOR FLUID-SUPPLY PIPES

Application filed September 22, 1928. Serial No. 307,751.

This invention relates to fluid distribution and more particularly to an outlet terminal for a fluid supply pipe.

When constructing a building it is customary to lead the pipes which conduct gas, water, and steam to various rooms, through the walls and between the floors and ceilings of the rooms with their end portions projecting outwardly from the walls and floors and these extended ends are connected with service pipes leading to stoves, radiators, bathroom appliances, or other articles to be supplied with fluid under pressure. Many people prefer to have radiators or gas heaters removed during warm seasons of the year when they are not in use and also it often happens that a person will desire to change the location of a heater, wash-basin, sink, or similar appliance but, under present conditions, this cannot be very conveniently done as when the heater or other appliance is removed, the end portion of the supply pipe projecting from the wall or floor of a room, remains in place and is not only unsightly but in the way and is liable to cause damage to furniture as well as cause injury to a person who may accidentally strike the extending pipe end. The pipe which projects into the room is usually engaged with a coupling within a wall or between a floor and ceiling and even if the extended end portion of the pipe is engaged by a wrench in order to hold it against turning when disconnecting a service pipe from its outer end and apply a cap thereto, there is likelihood of the projecting pipe being turned and loosened from the hidden coupling, thereby causing leaks to occur which would cause serious damage when the water, gas or steam is again turned on.

Therefore, one object of the invention is to provide a pipe terminal adapted to be connected with a supply pipe extending through a wall or between a floor and ceiling and so formed that it outer end will be exposed so that a service pipe may be connected with it or easily released therefrom, as occasion may require.

Another object of the invention is to so form the terminal that when it is in place and engaged with a supply pipe it may be firmly held against rotation in either direction and thereby allow a service pipe to be screwed tightly into place or released from the coupling without danger of the coupling turning and causing leakage to occur within a wall or between a floor and ceiling of a room.

Another object of the invention is to so form the terminal that when a service pipe is removed therefrom a closure plug may be inserted in order to tightly close the outer end of the terminal and to further provide this terminal with a face plate having an opening therein to be closed by a removable cap when a service pipe is disconnected from the terminal and thereby prevent dust and dirt from accumulating in the terminal and also allow the outer end portion of the threaded bore of the terminal to be packed with grease when a service pipe is disconnected therefrom and prevent danger of rusting occurring, which would interfere with the replacement of the service pipe.

Another object of the invention is to provide the terminal with a face plate adjustably connected therewith so that it may be embedded in a chair-board or floor flush with the outer surface thereof so that it will be neat in appearance and also provide a smooth surface which will not prevent furniture from being easily moved about a room or located wherever desired.

The invention is illustrated in the accompanying drawing, wherein:

Figure 1 is a perspective view showing a portion of a room and disclosing the improved terminals in place with a service pipe connected with one terminal.

Figure 2 is an enlarged view showing one of the terminals in end elevation, looking from the outer end thereof.

Figure 3 is a transverse sectional view taken through one of the terminals on the line 3—3 of Figure 2, with the terminal connected with a supply pipe and located in position for use.

Figure 4 is a view looking at the inner face of the face plate of the terminal.

Figure 5 is a fragmentary sectional view through the face plate with the closure cap for its opening removed and shown in elevation.

The outlet terminal constituting the subject matter of this invention is in some respects similar to that disclosed by us in a previous application filed December 20, 1926, Serial No. 156,013, and of which the present application constitutes a continuation in part.

This terminal includes a body portion 1 having a bore 2 formed therein, the end portions 3 and 4 of which are enlarged to receive a supply pipe 5 and service pipe 6. The bore is also threaded, as shown at 7 and 8, in order to accommodate smaller pipes and particularly to allow a plug 9 to be screwed into place when the service pipe 6 is removed. The outer end portion of the body is enlarged to provide an end portion which is non-circular in cross section. This end portion may be square, triangular, or any other shape desired which is non-circular, but in the present illustration the enlarged end portion is formed with side arms 10 which project from opposite sides of the body, as shown in Figures 2 and 3, and are adapted to be received in correspondingly shaped extensions 11 leading from opposite sides of an opening 12 formed in a chair board 13 or floor, and through which the terminal extends when connected with the supply pipe 5.

In order to cover the opening in the chair board or floor in which the terminal is disposed, there has been provided a face plate 14 which is of greater dimensions than the outer end of the body and is preferably countersunk in a seat or recess 15 formed in the chair board or floor about the opening. By having the face plate countersunk it will be neat in appearance and, in addition, furniture may be easily moved about a room or set in a desired location without interference.

This face plate is removably secured to the body of the terminal by screws 16 which are passed through openings formed in the face plate and screwed into threaded sockets 17 formed in the side wings 10 and, if necessary, spacing washers 18 may be placed upon the screws so that a firm connection will be provided between the face plate and the body portion of the terminal. An opening 19 is formed in the face plate centrally thereof, which is alined with the bore of the body when the face plate is secured to the body so that the service pipe 6 may be passed through this plate and screwed into the outer end portion of the body, and in order to close this opening when the service pipe is removed there has been provided a closure cap or disc 20 which fits snugly into the opening with its outer face flush with the outer face of the face plate. This cap may be removably secured in any manner desired but, in the present illustration, it is releasably held in place by a locking strip 21 secured against the inner surface of the closure disc with its end portion projecting to provide tongues 22 adapted to pass inwardly between annular flanges 23 projecting from the walls of the opening 19 and engage the inner surfaces of these flanges to secure the disc when the disc is set in place and turned to a locked position, as shown in Figure 4. This closure disc and its securing means constitute the subject matter of a co-pending application where the construction is more specifically set forth.

When the improved terminal outlet is in use it is screwed into engagement with a supply pipe and disposed within an opening corresponding in shape to its enlarged outer end portion so that when the terminal is in place it will be prevented from rotating in the opening. This terminal may be located in a chair board, floor, ceiling, or any other place desired. After the body has been connected with the supply pipe and moved into the opening, the face plate is applied and secured by its screws. It will thus be seen that the supply pipe will be provided with a terminal so located that ready access may be had to the same by removing the closure disc 20 but, at the same time, the terminal will be neat in appearance and not constitute an obstruction when a service pipe is removed therefrom. The service pipe may be of any length and lead to a gas heater, steam or hot water radiator, sink or any other appliance desired necessitating a supply of fluid under pressure. When it is desired to remove a radiator or other appliance the service pipe can be easily unscrewed and after the plug 9 has been put in place the cap applied to close the opening in the face plate. Since the outer end portion of the terminal is non-circular in cross section and seated in a correspondingly shaped portion of the opening in the chair board or floor it will be positively held against rotation in either direction and, therefore, a service pipe can be screwed very tightly into place or released if it does not unscrew easily, without danger of turning the terminal or the coupled sections of a supply pipe and there will be no danger of leaks occurring within a wall or between a floor and ceiling of a room. After the plug 9 has been screwed tightly into place the fluid will be prevented from escaping when again turned on and, if so desired, the outer end portion 4 of the bore may be filled with grease in order to prevent the threads from becoming rusted. We have, therefore, provided a terminal for a supply pipe which is efficient in operation and will not be unsightly when a radiator or other appliance is temporarily or permanently disconnected.

What is claimed is:

1. An outlet terminal for a pipe comprising a body formed with a bore having its end portions threaded to receive a supply pipe and a service pipe respectively, the outer end portion being provided with a head non-circular in form and adapted to prevent rotation of the body when the body is engaged with a supply pipe and its head disposed in an opening conforming substantially to the contour thereof, a cover plate of greater dimensions than the outer end of said body for covering an opening through which the body is adapted to extend formed with an opening alined with the bore of the body, a closure for the opening in said plate, and means to secure said plate to said body.

2. An outlet terminal for a pipe comprising a body formed with a bore having its end portions threaded to receive a supply pipe and a service pipe respectively, a portion of said body being enlarged to form a portion non-circular in cross section and adapted to prevent rotation of the body in a similarly shaped opening through which the body passes when engaged with a supply pipe, a cover plate for the opening formed with an opening alined with the bore of the body, means to removably and adjustably secure said cover plate to said body, and a removable closure for the opening in said plate.

3. An outlet terminal for a pipe comprising a body formed with a bore having its end portions threaded to receive a supply pipe and a service pipe respectively, an intermediate portion of the bore being reduced and threaded to receive a removable closure plug for the outer end thereof, a plug adapted to be screwed into the reduced portion of the bore to close the bore, a portion of the body being enlarged and non-circular in cross section to prevent rotation of the body when disposed in an opening formed in a member through which the terminal passes when engaged with a supply pipe, a face plate connected with the outer end of said body and formed with an opening alined with the bore of said body, and a removable closure for the opening in said plate.

4. An outlet terminal for a pipe comprising a body formed with a bore having its end portions threaded to receive a supply pipe and a service pipe respectively, said body being provided with means to prevent rotation of the body when engaged with a supply pipe and disposed in an opening in a member through which the terminal passes, and a face plate removably connected with the outer end of said body to cover the opening in the member and formed with an opening alined with the bore of said body, and a closure for the opening in said plate.

5. An outlet terminal for a pipe comprising a body formed with a bore having its end portions threaded to receive a supply pipe and a service pipe respectively, said body being provided with means to prevent rotation of the body when engaged with a supply pipe and disposed in an opening in a member through which the terminal passes, a face plate formed with an opening, a closure for the opening in said plate, securing screws passed through said plate and into the outer end of said body, and spacers upon the screws between the body and plate.

In testimony whereof we affix our signatures.

LEON T. RICHEY. [L. S.]
ALFRED S. DOTY. [L. S.]